United States Patent

[11] 3,603,671

| [72] | Inventor | David Scatcherd Brown |
| | | Newcastle, Upon Tyne, England |
| [21] | Appl. No. | 819,162 |
| [22] | Filed | Apr. 25, 1969 |
| [45] | Patented | Sept. 7, 1971 |
| [73] | Assignee | Sir Howard Grubb Parsons and Company Limited |
| | | Newcastle, Upon Tyne, England |
| [32] | Priority | May 1, 1968 |
| [33] | | Great Britain |
| [31] | | 20557/68 |

[54] ASTRONOMICAL TELESCOPES
4 Claims, 7 Drawing Figs.

[52] U.S. Cl. .................................................. 350/310
[51] Int. Cl. .................................................. G02b 5/08
[50] Field of Search .................................................. 350/17, 310, 285, 288, 299

[56] References Cited
UNITED STATES PATENTS

| 3,063,343 | 11/1962 | Kaestner ...................... | 350/310 |
| 3,427,097 | 2/1969 | Dryden ......................... | 350/310 |
| 3,468,595 | 9/1969 | Humphrey .................... | 350/16 |

FOREIGN PATENTS

| 1,039,252 | 9/1958 | Germany ...................... | 350/310 |

Primary Examiner—David Schonberg
Assistant Examiner—Michael J. Tokar
Attorney—Holman and Stern ABSTRACT: Means for correcting astigmatic distortion produced by changes in orientation of an astronomical telescope mirror, which means comprise a series of devices for applying forces acting in a direction parallel to the optical axis of the mirror in the region of the mirror outer edge which forces increase with increase in the zenith angle and have a sense and a distribution around the mirror edge so as to oppose the said distortion.

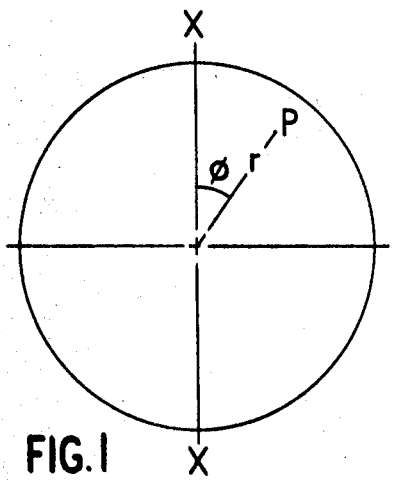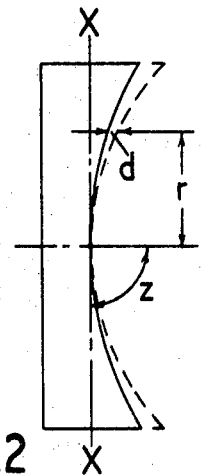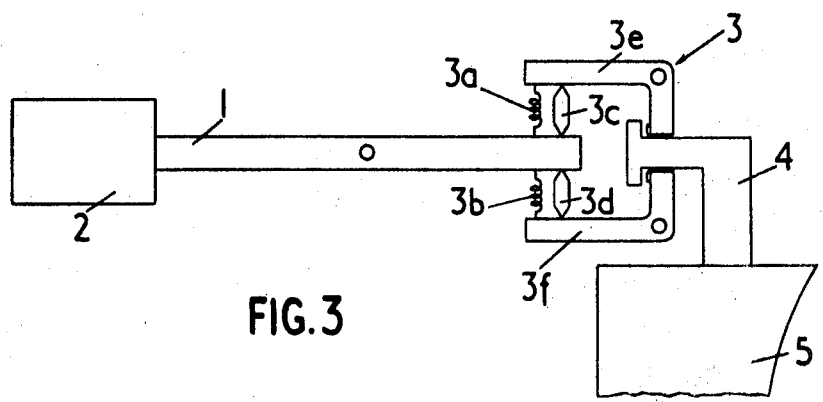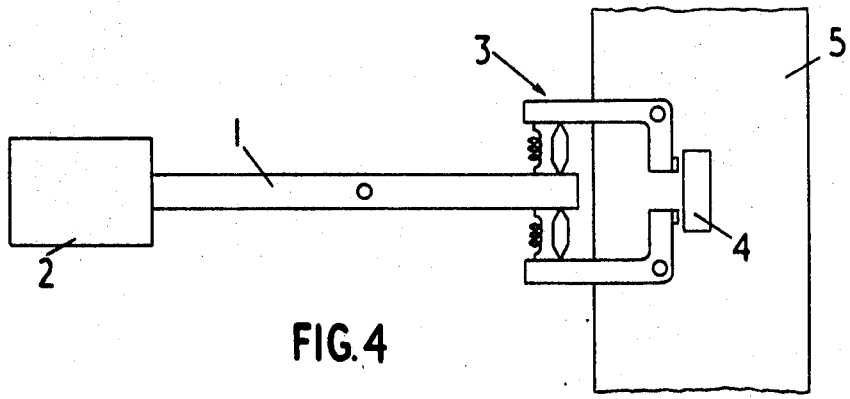

ASTRONOMICAL TELESCOPES

This invention relates to astronomical telescopes.

It is common practice to support mirrors for large astronomical telescopes by a system which comprises axial support devices supporting the component of mirror weight parallel to the optical axis of the mirror and radial support devices which support the component of mirror weight normal to the optical axis of the mirror.

The radial support devices may act on the mirror edge only or be applied at points distributed uniformly throughout the body of the mirror. The latter arrangement suffers from the disadvantage that it is difficult in many instances to avoid interference with the performance of the very precise axial support devices.

Provision of radial support devices around the mirror edge only, gives greater freedom from interference with the axial support devices but on the other hand may result in significant mirror distortion, particularly astigmatic distortion, due to mirror orientation, especially when the telescope is used with its axis at large angles from the zenith.

The object of the present invention is to provide means for correcting such distortions.

The present invention consists in means for correcting astigmatic distortion produced by changes in orientation of an astronomical telescope mirror, which means comprise a series of devices for applying forces acting in a direction parallel to the optical axis of the mirror in the region of the mirror outer edge which forces increase with increase in the zenith angle and have a sense and a distribution around the mirror edge so as to oppose the said distortion.

In a preferred embodiment the said means supplement axial support devices supporting the component of mirror weight parallel to the optical axis of the mirror and radial support devices supporting the component of mirror weight normal to the optical axis of the mirror and acting at the mirror edge only.

In one embodiment of the invention the said means comprise devices each in the form of a pivoted lever actuated by a weight at one end and actuating a force transmitting arrangement at the other end, the pivoted lever being constrained to move from an equilibrium position where it is parallel to the mirror axis in a plane containing the lever and the optical axis of the mirror, whereby movement of the pivoted lever on either side of the equilibrium position when no force is transmitted to the mirror edge, causes the force transmitting arrangement to apply a force always in the same direction to the mirror edge.

In another embodiment of the invention the said means comprise devices each in the form of a pivoted lever actuated by a weight at one end and actuating a force-transmitting arrangement at the other end, the pivoted lever being constrained to move from an equilibrium position where it is parallel to the mirror axis in a plane tangential to the mirror edge, whereby movement of the pivoted lever on either side of the equilibrium position when no force is transmitted to the mirror edge, causes the force-transmitting arrangement to apply a force always in the same direction to the mirror edge.

In yet a further embodiment said means comprise devices in accordance with the first of the preceding two paragraphs and devices in accordance with the preceding paragraph.

In another embodiment the said means comprise devices each having a pivoted lever actuated by a weight at one end and actuating two force-transmitting arrangements, one transmitting a force parallel to the mirror axis in one direction and the other a force parallel to the mirror axis in the opposite direction each force-transmitting arrangement acting as a constraint on the lever.

The invention also consists in means for correcting astigmatic distortion substantially as described herein with reference to the accompanying drawings in which:

FIG. 1 is a diagrammatic representation of the front view of a telescope mirror, and FIG. 2 a side view of the same mirror showing on an enlarged scale distortion produced by changes in mirror orientation and showing various parameters used in deriving equations for the distortion;

FIG. 3 shows a device in accordance with the invention for applying a correcting force to counteract distortion;

FIG. 4 is a view of an alternative form of the device shown in FIG. 3;

Figure 5:
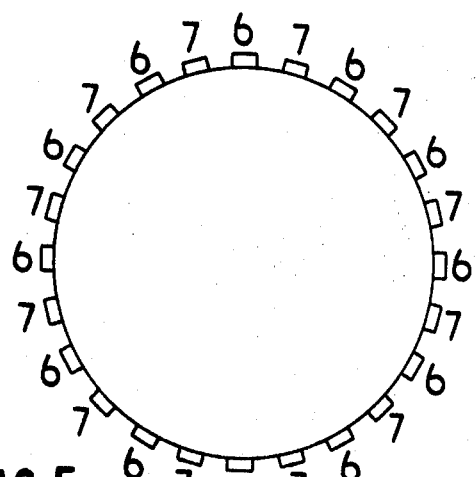
FIG. 5 shows a typical disposition of devices shown in FIGS. 3 and 4 around the edge of a telescope mirror.

Referring to FIGS. 1 and 2, the position of a point on the surface of a mirror is defined by the polar coordinates $(r, \Phi)$ of its projection on a plane tangential to the mirror surface at its center. An astigmatic distortion $d$ of the mirror surface, measured parallel to the mirror axis, can be shown to be $$d = A \sin z \, r^2 \cos^2 \Phi$$

where $A$ is a constant, and $z$ is the angle between the mirror axis and the vertical XX.

For the position shown in FIGS. 1 and 2 with the optical axis of the mirror horizontal, the angle $z$ is 90°.

By applying axial correcting forces in the region of the mirror edge, $r$ is constant for the applied forces and it is then necessary to cause the applied force to vary as $\sin z \cos^2 \Phi$ as the mirror orientation changes.

FIG. 3 shows a device for applying an axial force to the mirror edge such that the force varies as $\sin z \, [\cos \Phi.]$, the use of the square brackets indicating that the quantity enclosed has always a positive sign. The replacement of $\cos^2 \Phi$ by $[\cos \Phi]$ in the above equation introduces a small error but this is negligible in practice. The device consists essentially of a pivoted lever 1 at one end of which is a weight 2 while the other end actuates a force-transmitting arrangement 3 which acts to transmit an axial correcting force to a projection 4 on the edge of mirror 5.

The lever 1 is, in its equilibrium position, parallel to the mirror axis and is constrained to move in a plane containing the lever and the optical axis of the mirror and can move slightly on either side of the equilibrium position shown in which position no force is applied to the mirror. The action of the force transmitting arrangement is such that the correcting force is always applied in the same direction.

If the orientation of the mirror is such that the weight 2 moves downwards the opposite end of the lever moves upwards and actuates through springs 3a, 3b and push rods 3c, 3d the cranked pivoted levers 3e, 3f. Cranked lever 3e would pivot so that its end nearest projection 4 moves away therefrom while the end of cranked lever 3f moves forward to contact the projection 4 and apply an axial force thereto.

With this arrangement the applied force is proportional to $\sin z \, [\cos \Phi]$ because the weight 2 acts vertically and is partially opposed by the radial constraint (giving proportionality to $\cos \Phi$) and the component of weight normal to the lever is proportional to $\sin z$ since the lever is parallel to the telescope axis.

If weight 2 moves upwards as a result of change in orientation of the mirror the end of cranked lever 3e moves into contact with the projection 4 to apply the axial force while the end of cranked lever 3f nearest the projection 4 moves away therefrom. It will be seen, therefore, that the force is always applied in the same direction.

In a typical application many devices such as that shown in FIG. 3 would be placed equally spaced around the mirror edge and when a lever lies in a vertical plane containing the optical axis of the mirror the $[\cos \Phi]$ term is at its maximum decreasing to zero when the mirror moves with the telescope to a position where the plane containing the optical axis of the mirror and the lever is horizontal. In the latter position the constraints which allow movement when the lever and optical axis are in vertical plane act to prevent any movement of the lever and hence no force is applied to the projection 4. For positions of the mirror between these two extremes the applied force varies as sin $z$ [cos $\Phi$] as explained above.

In an alternative arrangement devices can be used to apply forces varying as sin $z$ [sin $\Phi$]. These would be of basically the same construction as that shown in FIG. 3 but would be adapted to apply forces of equal magnitude to those of the device in FIG. 3, but in an opposite direction.

If it is desired to have the device on the same side of the mirror as the device shown in FIG. 3 the projection is modified in shape as shown in FIG. 4 so that the applied force is in the opposite direction to that shown in FIG. 3. Otherwise the construction is the same except that the lever 1 is constrained to move only in a plane tangential to the mirror edge. With such an arrangement the maximum applied force occurs when the orientation of the mirror is such that lever 1 is free to move in a plane tangential to the mirror edge.

If the devices of either FIG. 3 or FIG. 4 are used on their own, an overall axial force will be applied to the mirror, the force being proportional to sin $z$, and it will be necessary to correct the axial force exerted by the axial devices by this amount. Such a correction can be achieved by weight controlled trimming devices which act to vary the force exerted by the axial support devices. If the axial support devices consist of one or more gas-filled bags supporting the mirror the trimming device can act on the pressure controller or controllers controlling the static air pressure in the bags.

To avoid the need for such correction of the axial support devices, the devices of FIG. 3 and 4 can be used in combination so that the total resultant axial force of the two sets of devices is zero.

FIG. 5 shows the disposition of devices for this purpose. Devices 6 correspond to the devices shown in FIG. 3 and devices 7 correspond to those shown in FIG. 4.

Figure 6:
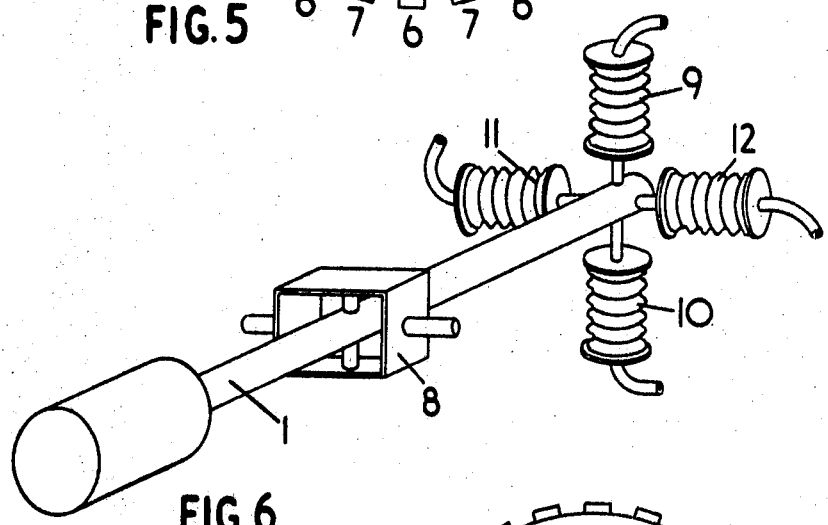
FIG. 6 shows a further form of device in accordance with the invention for applying axial forces to correct distortion.
Figure 7:
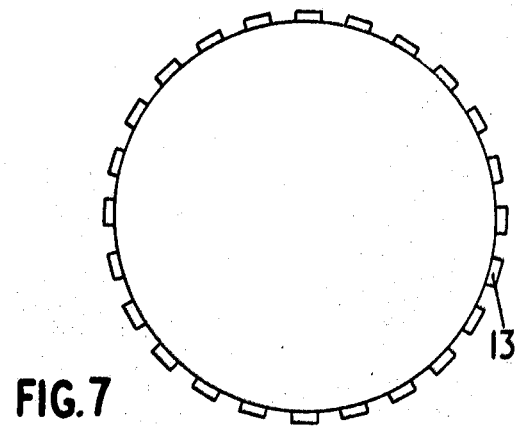
FIG. 7 shows a typical disposition of devices of FIG. 6 around the edge of a telescope mirror.

FIG. 6 shows a device in which the pivoted lever 1 is mounted in a gimbal system 8. Instead of a force-transmitting arrangement using levers, a hydraulic arrangement is shown. Movement of the lever 1 in one plane acts to increase the pressure in cylinder 9 and to reduce the pressure in cylinder 10 to atmospheric or vice versa while the hydraulic pressure in cylinders 11 and 12 remains at atmospheric. Movement of the lever in the other plane acts to increase the pressure in cylinder 11 and reduce the pressure in cylinder 12 to atmospheric or vice versa when the pressure in cylinders 9 and 10 is atmospheric. The pressures in cylinders 9–12 are used to actuate force transmitting devices disposed around the mirror in the manner shown at 13 in FIG. 7.

I claim:

1. In an astronomical telescope mirror support system having axial support devices supporting the component of mirror weight parallel to the optical axis of the mirror and radial support devices supporting the component of mirror weight normal to the optical axis of the mirror, the improvement comprising means for correcting residual astigmatic distortion produced by changes in orientation of the mirror, said correcting means comprising a plurality of devices for applying forces in a direction parallel to the optical axis of the mirror in the region of the mirror outer edge, which forces increase with an increase in the zenith angle and have a sense and distribution around the mirror edge so as to oppose the said distortion, according to one of the relationships sin $z$ cos$^2$ $\Phi$ sin $z$ [cos$\Phi$] where [cos$\Phi$] is positive, and sin $z$ [sin$\Phi$] where is positive, where $z$ represents the angle between the mirror axis and the vertical and $\Phi$ represents the angles between the points at which the forces are applied as projected on a plane tangential to the mirror surface at its center and the vertical, said correcting means supplementing said axial support devices and said radial support devices and acting at the mirror edge only, each device for applying forces having a pivoted lever actuated by a weight at one end and actuating at least one force-transmitting arrangement at the other end, said force transmitting arrangement transmitting said force to a projection on the edge of said mirror.

2. Apparatus according to claim 1, which includes devices each in the form of a pivoted lever actuated by a weight at one end and actuating a force-transmitting arrangement at the other end, the pivoted lever being constrained to move from an equilibrium position where it is parallel to the mirror axis in a plane containing the lever and the optical axis of the mirror, whereby movement of the pivoted lever on either side of the equilibrium position when no force is transmitted to the mirror edge, causes the force-transmitting arrangement to apply a force always in the same direction to the mirror edge.

3. Apparatus according to claim 1, which includes devices each in the form of a pivoted lever actuated by a weight at one end and actuating a force-transmitting arrangement at the other end, the pivoted lever being constrained to move from an equilibrium position where it is parallel to the mirror axis in a plane tangential to the mirror edge, whereby movement of the pivoted lever on either side of the equilibrium position when no force is transmitted to the mirror edge, causes the force-transmitting arrangement to apply a force always in the same direction to the mirror edge.

4. Apparatus according to claim 1, which includes devices each having a pivoted lever actuated by a weight at one end and actuating two force-transmitting arrangements, one transmitting a force parallel to the mirror axis in one direction and the other a force parallel to the mirror axis in the opposite direction each force transmitting arrangement acting as a constraint on the lever.